United States Patent
Cook et al.

(10) Patent No.: US 6,874,977 B2
(45) Date of Patent: Apr. 5, 2005

(54) HIGH PRESSURE COOLANT SYSTEM

(75) Inventors: James E. Cook, Charlevoix, MI (US); Rodney Longnecker, Ortonville, MI (US)

(73) Assignee: Morrell Incorporated, Auburn Hills, MI (US)

(*) Notice: Subject to any disclaimer, the term of this patent is extended or adjusted under 35 U.S.C. 154(b) by 0 days.

(21) Appl. No.: 10/066,854

(22) Filed: Feb. 4, 2002

(65) Prior Publication Data

US 2003/0147708 A1 Aug. 7, 2003

(51) Int. Cl.[7] .............................................. B23B 35/00
(52) U.S. Cl. ........................... 408/1 R; 408/56; 408/57; 408/61
(58) Field of Search ........................ 408/56, 57, 59–61, 408/8, 1 R; 409/135, 136, 137

(56) References Cited

U.S. PATENT DOCUMENTS

| | | |
|---|---|---|
| 4,076,442 A | 2/1978 | Cox, Jr. et al. |
| 4,284,670 A | 8/1981 | Kole |
| 4,456,408 A | 6/1984 | Glasow |
| 5,145,298 A | 9/1992 | Marantette |
| 5,297,657 A | 3/1994 | McConkey |
| 5,378,091 A | 1/1995 | Nakamura |
| 5,466,071 A | 11/1995 | Slocum |
| 5,494,134 A | 2/1996 | McConkey |
| 5,559,713 A * | 9/1996 | Brown et al. ................ 700/174 |
| 5,689,434 A | 11/1997 | Tambini et al. |
| 5,794,441 A | 8/1998 | Lisniansky |
| 5,927,410 A | 7/1999 | Greer et al. |
| 5,951,216 A * | 9/1999 | Antoun ......................... 408/56 |
| 6,196,773 B1 * | 3/2001 | Hyatt et al. .................. 408/1 R |
| 6,217,004 B1 | 4/2001 | Tanner |
| 6,220,798 B1 | 4/2001 | Kress et al. |
| 6,241,432 B1 * | 6/2001 | Sasanecki ..................... 408/56 |

OTHER PUBLICATIONS

Statement of Facts.

* cited by examiner

*Primary Examiner*—Daniel W. Howell
(74) *Attorney, Agent, or Firm*—Harness, Dickey & Pierce, P.L.C.

(57) ABSTRACT

A coolant system for a machining center includes a cutting tool selectively engageable with a work-piece and includes a pump for supplying a flow of coolant to the cutting tool, a motor drivingly engaging the pump, a pressure transducer measuring the pressure of the coolant being supplied to the cutting tool and a controller in communication with the pressure transducer and the motor. The controller compares the pressure measured to a predetermined target pressure and varies the speed of the motor to minimize deviation of the measured pressure from the target pressure.

5 Claims, 1 Drawing Sheet

HIGH PRESSURE COOLANT SYSTEM

BACKGROUND AND SUMMARY OF THE INVENTION

The present invention pertains generally to coolant systems and, more particularly, to a high pressure coolant system configured to provide a constant coolant pressure at a cutting tool to component interface.

In the field of production machining, it is highly desirable to construct a machining center capable of quickly and cost effectively cutting materials such as metal to precise dimensions for use in machine components. For example, general combustion engines are often times constructed from forged or cast metal components requiring a variety of machining operations to place them in condition for use within the engine.

Many manufacturers have had difficulty economically and reliably machining mass volumes of such engine components. Difficulty arises in attempting to design a coolant system capable of compensating for changes in the type of tooling used for a specific operation, the pre-machined size or location of a given surface or feature, the material properties of a specific component to be machined, the type of coolant used by a manufacturing facility, the path through which the coolant flows through the tool, the machining philosophy of the given tooling engineer and a variety of other yet to be determined factors. It should be appreciated that proper coolant flow provides a mechanism for removing chips created during the machining process and a heat transfer mechanism to dissipate energy from the cutting tool. If either of these functions are impaired, tool life and quality of cut will be negatively impacted.

One existing coolant system attempts to account for the aforementioned variables by maintaining a constant pressure at the tool to work-piece interface. The system incorporates a pressure relief valve positioned upstream from the cutting tool. An operator adjusts the pressure relief valve to define the coolant pressure at the tooling to work piece interface. However, it is unknown what flow rate is required to produce such pressure and the flow rate will vary depending on the numerous factors listed. In order to assure the requisite flow rate is present, coolant is pumped at a rate exceeding the maximum rate possibly required. As such, the system is over-designed to provide an increased flow rate to assure that some coolant is always being pumped into a reservoir. Many inefficiencies are incorporated within such a design. Specifically, the pump and the motor driving the pump are larger than necessary. The over-sized components not only cost more to purchase but also require more energy to operate than their smaller counterparts. Additionally, pumping excess flow generates heat which must be dissipated.

The existing coolant system described utilizes the pressure relief valve as an "active valve". As an active valve, the pressure relief valve must continuously compensate for varying machining conditions in an attempt to maintain a constant pressure at the cutting tool to work-piece interface. Pressure relief valves are not commonly designed to function in this manner. Most pressure relief valves are unable to provide the system response desired. Unfortunately, a constant pressure is not maintained at the cutting interface.

In accordance with the present invention, a high pressure coolant system includes a pump, a variable speed drive and a pressure feedback control system. To maintain a constant pressure at the tool to work-piece interface, the drive mechanism speed is varied which in turn varies the pump speed to provide a known volumetric flow rate. A closed loop control varies the motor speed to maintain the desired pressure at the tool to work-piece interface.

Further areas of applicability of the present invention will become apparent from the detailed description provided hereinafter. It should be understood that the detailed description is specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following detailed description of the preferred embodiment is merely exemplary in nature and is in no way intended to limit the invention, its application, or uses. For example, the apparatus and techniques disclosed herein may have utility for cooling and lubricating a variety of different systems.

Figure 1:
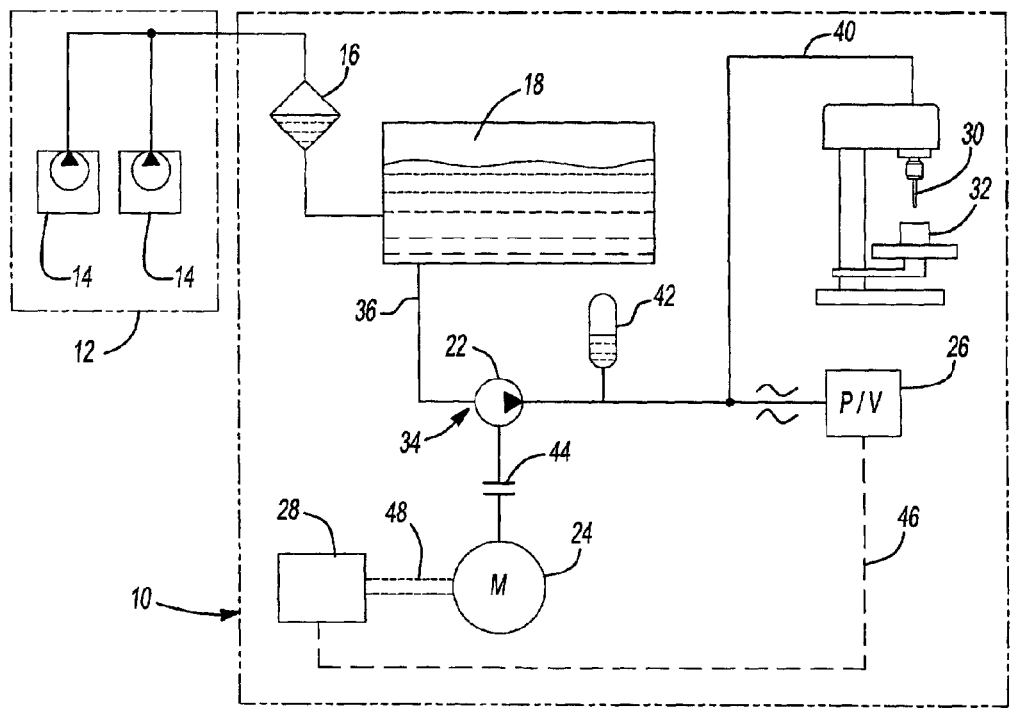
FIG. 1 is a schematic view of a high pressure coolant system constructed in accordance with the teachings of the present invention.

With reference to FIG. 1, an exemplary high pressure coolant system 10 is shown coupled to a central coolant system 12. In most cases, the high pressure coolant system is supplied by a central coolant system 12 which includes several pumps 14 to supply coolant to the high pressure coolant system 10 at a pressure of approximately 40 to 50 P.S.I. Preferably, reservoir 18 is vertically oriented to reduce required floor space. It should be appreciated that high pressure coolant system 10 may function as a stand-alone system disconnected from central coolant system 12.

High pressure coolant system 10 includes inlet filter 16, a pump 22, a motor 24, a pressure transducer 26, and a controller 28. High pressure coolant system 10 functions to maintain a constant coolant pressure at the interface between a cutting tool 30 and a work-piece or component 32. Controller 28 is in communication with motor 24 and pressure transducer 26. Pressure transducer 26 provides controller 28 with a signal indicative of the coolant pressure present at the tool to work-piece interface. Controller 28 is programmed to interpret the data supplied by pressure transducer 26 and modify the rotational speed of motor 24. A change in the rotational speed of motor 24 causes a proportional change in speed of pump 22. As such, the volumetric flow rate of coolant supplied to the tool is modified. Because the coolant pressure at the tool to work-piece interface is related to the volumetric flow rate of coolant supplied, pressure may be accurately regulated in the manner described.

Each of the components of high pressure coolant system 10 will now be more completely described. An inlet 34 of pump 22 is coupled to reservoir 18 via a line 36. The outlet of pump 22 is coupled to cutting tool 30 via a line 40. An optional pulsation damping device 42 is coupled to line 40 downstream of pump 22. Pulsation damping device 42 serves to alleviate any "noise" signal that the motor or pump may introduce based on the physical characteristics of the system. Pressure transducer 26 is also plumbed along line 40, downstream from pump 22.

Within one embodiment of the present invention, pump 22 is constructed as a fixed displacement pump. By definition, a fixed displacement pump displaces a predetermined volume of coolant per input shaft revolution. A desired volumetric flow rate may be provided from pump 22 by rotating the pump at a specified speed. Due to its relatively simple construction, the fixed displacement pump design provides nearly instantaneous flow at the desired rate given the proper input speed. One skilled in the art will appreciate that the pump response characteristics previously described are beneficial because the present invention coolant system controls tool to work-piece pressure by varying flow rate.

At least three types of fixed displacement pumps are commercially available. The first type has a diaphragm while the second type includes a screw as the fluid driver. The third type is an impeller pump. Because machine tool coolant includes a relatively high level of contamination, use of a screw type fixed displacement pump is beneficial. While use of a fixed displacement pump is described, it should be appreciated that a number of different pump designs including variable displacement pumps may be utilized without departing from the scope of the present invention.

As shown in FIG. 1, motor 24 is drivingly engaged with pump 22 via a mechanical coupling 44. Motor 24 is preferably an A/C induction motor. Because motor 24 is directly coupled to first displacement pump 22, the volumetric flow rate exiting pump 22 is directly proportional to the speed of motor 24. This system characteristic will be utilized to construct a closed-loop control system for generating the desired coolant pressure at the work-piece to cutting tool interface as will be described in greater detail hereinafter.

Pressure transducer 26 is preferably a piezo-electric pressure sensor having a working range from 100 to 3000 p.s.i. Pressure transducer 26 produces a signal 46 for communication with electronic controller 28. Electronic controller 28 is a variable frequency drive and controls the rotational speed of drive motor 24. Electronic controller 28 manipulates pressure signal 46 using a proportional, integral, derivative closed-loop control algorithm. Specifically, controller 28 compares the pressure measured by pressure transducer 26 to a predetermined target pressure. A signal 48 is transmitted from controller 28 to motor 24 to modify the motor speed to account for any deviation of measured pressure from target pressure. Line 40 provides the path for coolant traveling at the revised flow rate to enter and pass through cutting tool 30. High pressure coolant system 10 functions to maintain a constant coolant pressure between cutting tool 30 and a work-piece 32 by continuously monitoring coolant pressure and adjusting pump speed to minimize any differential between the measured pressure and the target pressure. Therefore, the present invention is able to maintain the target pressure without regard to variation in machining conditions.

Figure 2:
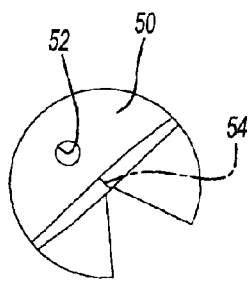
FIG. 2 is an end view of an exemplary first cutting tool for use with the coolant system of the present invention.
Figure 3:
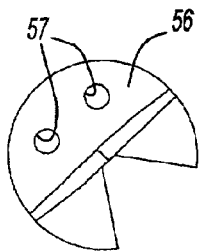
FIG. 3 is an end view of an exemplary second cutting tool for use with the coolant system of the present invention.
Figure 4:
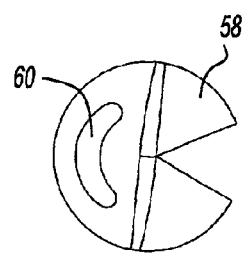
FIG. 4 is an end view of an exemplary third cutting tool for use with the coolant system of the present invention.

As mentioned earlier, given a certain volumetric flow rate, many factors play a role in defining the coolant pressure at the cutting tool to work-piece interface. For example, the shape, size and location of the coolant path relative to the axis of rotation of the cutting tool affects the pressure generated. FIGS. 2–4 depict only a few of the many cutting tools available having different coolant path geometries. A first cutter 50 includes a coolant aperture 52 offset from an axis of rotation 54. A second cutter 56 includes a pair of coolant apertures 57 located at the end of the tool spaced apart from one another and the axis of rotation. Yet another cutter 58 includes a kidney-shaped aperture 60 positioned offset from the cutter center as shown in FIG. 4. The high pressure coolant system of the present invention allows a machinist to utilize any number of cutting tool geometries without sacrificing cutter life or control of coolant pressure between the cutting tool and the work-piece.

Additionally, dimensional variance in the work-piece prior to machining greatly affects the pressure generated at the cutting tool to work-piece interface. For example, a variance in a pre-machined hole diameter of 0.0625 in. changed to 0.125 in. diameter generates a need to vary the volumetric flow rate by 400% to maintain a given pressure. Accordingly, in order to maintain a desired cutting tool to work-piece interface coolant pressure, the coolant flow must vary. High pressure coolant system 10 provides an appropriate coolant flow rate by signaling motor 24 to rotate at a desired speed.

To begin operation of high pressure coolant system 10, operator sets the target coolant pressure within controller 28. It should be appreciated that any number of methods for programming controller 28 may be used. Preferably, controller 28 is coupled to a user interface which prompts the user for a desired target pressure. The user may respond by entering numerals in a key pad or selecting options from a menu. The operator next starts motor 24. Motor 24 begins to rotate and increase in rotational speed. As the RPM of the electric motor increases, the flow rate of coolant exiting fixed displacement pump 22 increases linearly. As the flow from pump 22 increases, the pressure in line 40 increases due to flow resistance formed through the cutting tool and the work-piece to cutting tool interface. The magnitude of pressure present causes pressure transducer 26 to generate analog D.C. electrical signal 46 proportionate to the pressure. The analog D.C. electrical voltage (signal 46) is used to "feedback" the actual pressure of line 40 to controller 28. Electric motor RPM and pressure increase until the pressure transducer output in D.C. voltage equals a pressure command D.C. voltage. The pressure command D.C. voltage is proportionate to the predetermined target pressure entered earlier. At this point, the RPM of the electric motor will increase or decrease to maintain equilibrium between the commanded D.C. pressure voltage and the feedback D.C. pressure voltage.

The foregoing discussion discloses and describes an exemplary embodiment of the present invention. One skilled in the art will readily recognize from such discussion and from the accompanying drawings and claims, that various changes, modifications and variations can be made therein without departing from the true spirit and fair scope of the invention as defined by the following claims.

What is claimed is:

1. A coolant system for a machining center having a cutting tool selectively engageable with a work-piece, the coolant system comprising:

a pump for supplying a flow of coolant to the cutting tool;

a motor drivingly engaging said pump;

a pressure transducer measuring the pressure of said coolant being supplied to the cutting tool, said pressure transducer outputting an electrical pressure signal;

an accumulator plumbed between said pump and said pressure transducer to attenuate pump and motor noise from said pressure signal; and a controller in communication with said pressure transducer and said motor, said controller comparing said pressure signal to a predetermined target pressure and varying the speed of said motor to minimize deviation of said pressure signal from said target pressure.

2. The coolant system of claim 1 wherein said pump is a fixed displacement pump having a screw drive mechanism for displacing coolant.

3. The coolant system of claim 1 wherein said motor is controlled by an alternating current variable frequency drive.

4. The coolant system of claim 1 wherein said controller determines the speed of said motor by using a proportional, integral, derivative closed-loop control system.

5. A method of controlling coolant flow comprising:

pumping coolant through a cutting tool;

engaging said cutting tool with a work-piece thereby creating resistance to the coolant flow;

setting a target coolant pressure to be obtained between said cutting tool and said work-piece;

measuring the coolant pressure supplied to said cutting tool;

comparing the measured coolant pressure to the target coolant pressure;

varying the flow rate of coolant pumped to minimize the difference between said target coolant pressure and said measured coolant pressure; and damping a noise signal generated during said pumping step.

* * * * *